United States Patent
Smith et al.

(10) Patent No.: US 9,059,854 B2
(45) Date of Patent: Jun. 16, 2015

(54) PROTOCOL FOR AUTHENTICATING FUNCTIONALITY IN A PERIPHERAL DEVICE

(71) Applicants: Ned M. Smith, Hillsboro, OR (US); Steven E. Wells, Rancho Cordova, CA (US); Robert W. Strong, Folsom, CA (US)

(72) Inventors: Ned M. Smith, Hillsboro, OR (US); Steven E. Wells, Rancho Cordova, CA (US); Robert W. Strong, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/051,364

(22) Filed: Oct. 10, 2013

(65) Prior Publication Data
US 2014/0032907 A1  Jan. 30, 2014

Related U.S. Application Data

(62) Division of application No. 12/752,929, filed on Apr. 1, 2010, now Pat. No. 8,578,161.

(51) Int. Cl.
*G06F 21/44* (2013.01)
*H04L 9/32* (2006.01)
*G06F 21/70* (2013.01)
*G06F 21/62* (2013.01)

(52) U.S. Cl.
CPC ...... *H04L 9/32* (2013.01); *G06F 21/70* (2013.01); *H04L 9/3252* (2013.01); *G06F 21/44* (2013.01); *G06F 21/629* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 6,490,358 B1 | 12/2002 | Geer, Jr. et al. | |
| 7,526,785 B1* | 4/2009 | Pearson et al. | 725/31 |
| 7,822,973 B2* | 10/2010 | Okaya | 713/155 |
| 2003/0182584 A1* | 9/2003 | Banes et al. | 713/202 |
| 2006/0010079 A1 | 1/2006 | Brickell | |
| 2006/0059194 A1* | 3/2006 | Oh et al. | 707/103 R |
| 2006/0117181 A1 | 6/2006 | Brickell | |
| 2007/0282757 A1* | 12/2007 | Pandya et al. | 705/76 |
| 2008/0028214 A1* | 1/2008 | Tafoya et al. | 713/166 |
| 2008/0234047 A1 | 9/2008 | Nguyen | |
| 2008/0295180 A1* | 11/2008 | Yoneda | 726/27 |
| 2009/0083834 A1 | 3/2009 | Rubinstein et al. | |
| 2009/0143144 A1 | 6/2009 | Schluessler et al. | |
| 2009/0193267 A1 | 7/2009 | Chung | |
| 2010/0011211 A1* | 1/2010 | Anemikos et al. | 713/168 |
| 2010/0083381 A1 | 4/2010 | Khosravi et al. | |
| 2011/0154030 A1 | 6/2011 | Hazra et al. | |

(Continued)

OTHER PUBLICATIONS

Restriction Requirement from U.S. Appl. No. 12/752,929, mailed Jun. 14, 2012, 7 pages.

(Continued)

*Primary Examiner* — Gilberto Barron, Jr.
*Assistant Examiner* — Abdulhakim Nobahar
(74) *Attorney, Agent, or Firm* — Blakely, Sokoloff, Taylor & Zafman LLP

(57) ABSTRACT

A protocol provides authentication of peripheral devices by a computing device to which the peripheral device connects. Computing devices include a verifier with a public key that authenticates multiple associated private keys. Private keys are embedded on peripheral devices. When the verifier is able to authenticate a connected peripheral, particular functionality is enabled that may not be enabled for peripherals that do not authenticate.

17 Claims, 6 Drawing Sheets

(56) References Cited

U.S. PATENT DOCUMENTS

2011/0161672 A1* 6/2011 Martinez et al. ............. 713/176
2011/0246756 A1* 10/2011 Smith et al. ................. 713/2

OTHER PUBLICATIONS

Non-Final Office Action from U.S. Appl. No. 12/752,929, mailed Oct. 3, 2012, 11 pages.

Final Office Action from U.S. Appl. No. 12/752,929, mailed Mar. 13, 2013, 11 pages.

Advisory Action from U.S. Appl. No. 12/752,929, mailed May 20, 2013, 3 pages.

Notice of Allowance from U.S. Appl. No. 12/752,929, mailed Jul. 1, 2013, 12 pages.

* cited by examiner

PROTOCOL FOR AUTHENTICATING FUNCTIONALITY IN A PERIPHERAL DEVICE

This application is a Divisional of and claims priority to U.S. patent application Ser. No. 12/752,929 filed Apr. 1, 2010.

FIELD

Embodiments of the invention are generally related to peripheral device connections, and more particularly to authenticating device identity and functionality in a peripheral device.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2010, Intel Corporation, All Rights Reserved.

BACKGROUND

Peripheral devices such as storage devices (whether a computer hard drive or removable storage), multimedia devices, and other devices can connect to a computing device to provide functionality for the computing device. Ideally, the computing device would be designed to verify the identity of the peripheral connected. Identification of the device can indicate whether the device is considered "safe", and whether it is subject to a restriction policy (e.g., no cameras are allowed to be connected to a computing device of a company).

Traditional identification methods are based on the providing of an identification string to the computing device. The identification string is easily spoofed, and thus provides no guarantee that the device is what it is purported to be. In systems where functionality is provided to the peripheral depending on whether it complies with a particular standard (e.g., whether a device is vPro-compatible, where vPro is available on devices from Intel Corporation of Santa Clara, Calif.). It will be understood that all trademarks used herein are the sole property of their respective owners, and are simply used to identify the origin of the goods and services associated with the marks.

Use of access controls, such as that provided by the "BDF" interface (bus, device, function standard), can identify the peripheral device more reliably, but is typically implemented with unique device IDs, which can be tracked. Thus, privacy protections would be sacrificed for device identity verification. Additionally, unique device IDs creates a system that does not scale well, seeing the large number of IDs that would need to be managed to track the various peripheral devices. The use of key pairs (such as that employed in a public key infrastructure (PM)) would likewise not scale, and would cause a problem where device authentication could be comparable in cost to the cost of the peripheral itself.

Thus, known systems do not provide a scalable solution that allows verification of the identity of a peripheral device while respecting privacy of the device user.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
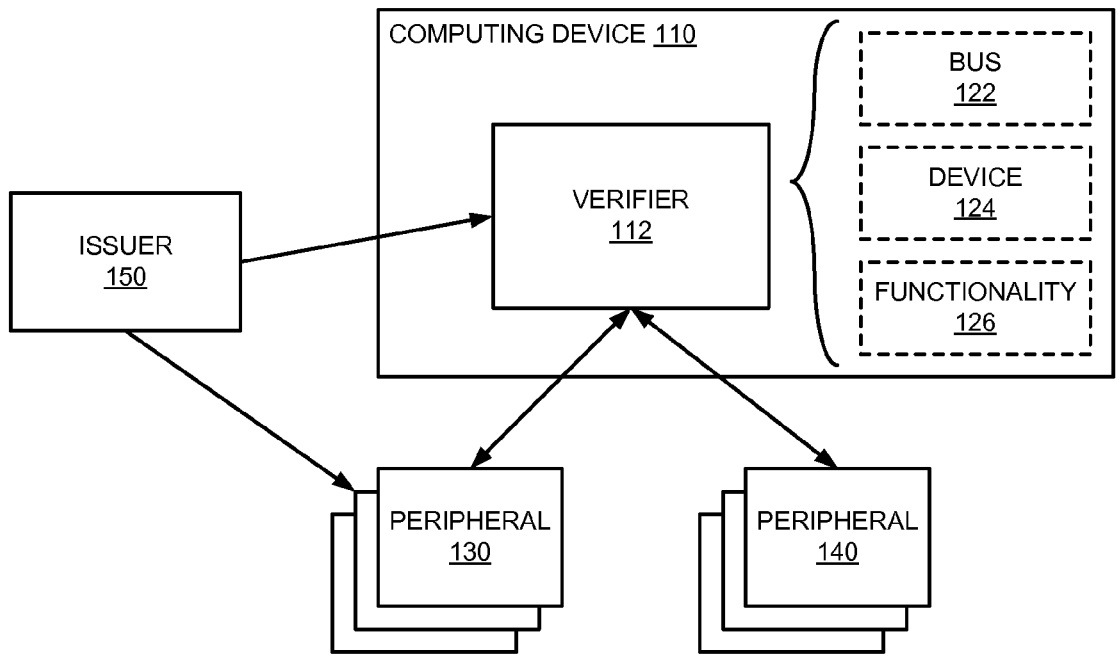
FIG. 1 is a block diagram of an embodiment of a system having a verifier to authenticate peripheral devices.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a private key is embedded in a peripheral device to authenticate the peripheral device to a computing device to which the peripheral device connects. The computing device includes a verifier with a public key that authenticates multiple associated private keys. With the public-private key verification, the verifier can authenticate the peripheral devices, while still maintaining privacy of the user of the peripheral. The private keys can be shared by groups of peripherals, such as by device type. The private keys can also be revoked without the need to change the verifier at the computing device, with the exception of adding a revocation list.

Whether the verifier is able to authenticate a connected peripheral affects functionality available to the connected peripheral device. Affecting the functionality is not just determining whether or not to allow the device to work with the computing device, but providing certain features to authenticated devices that are not enabled for non-authenticated devices. For example, a vPro enabled peripheral device that authenticates as having a valid private key may have vPro features enabled that would not be enabled to a device that does not have a valid private key indicating the peripheral device is vPro enabled. While vPro is used as one example, it will be understood that the protocol as described herein will work equally well with other feature-enabling technologies.

The peripheral device authentication protocol is used between a peripheral device and a verifier on a computing device. The peripheral device may include any number of devices that connect to computing device. Examples may include, but are not limited to, storage devices (e.g., USB (universal serial bus) drives or thumbdrives, hard drives such as SSDs (solid state drives), cameras, voice recorders, or other peripherals. In general, a peripheral device is "peripheral" to the primary system core that includes the processing resources, the memory (generally RAM (random access memory) or flash), and the hardware platform. The peripheral devices may connect to a bus of the primary system of the computing device, such as the USB, a serial advanced technology attachment (SATA) bus, a Firewire bus, or a SCSI (small computer system interface) bus.

The peripheral device (also referred to herein as simply a "peripheral") itself includes a hardware platform that includes the hardware logic that controls the functioning of the peripheral. The peripheral device includes hardware resources that can provide services or functionality to a computing device to which the peripheral device is connected. Such hardware resources may include storage, video or camera imaging hardware, sound recording hardware, user interface controllers, or other resources. The peripheral device includes a hardware port to connect to a hardware port of the computing device. Effectively, connecting to a hardware port of the computing device includes connecting to a bus corresponding to the hardware port.

The peripheral device is generally removably connected to the bus through the hardware port. Thus, the peripheral device may be removed and inserted into the computing device. Additionally, the peripheral device may be generally connectable to other computing devices. When connected to the computing device, the peripheral device can provide its peripheral function to the computing device. For example, storage devices connected to the computing device offer storage area for the computing device. As another example, a camera connected generally "looks like" a storage device when connected to a computing device, but provides the image capturing functionality through loading images taken with the peripheral.

In one embodiment, a peripheral device includes a private key stored in a storage element. The private key is one of multiple private keys able to be authenticated by a single public key. The private key can be considered to be associated with or to correspond to the public key because of the fact that it can be authenticated with the public key. The private key is authenticated when a message encrypted with the private key is validly decrypted with the public key. Thus, the peripheral device presents its private key to a connected computing device, which then authorizes functionality for its connection based on whether the peripheral device is validly authenticated and authorized. In one embodiment, private keys can be revoked, which is described in more detail below.

In one embodiment, the private key may be stored on an application specific integrated circuit (ASIC) that is embedded on the peripheral. The ASIC could include both the key as well as the logic necessary to implement the protocol. Thus, private keys could be generated and distributed to manufacturers of peripheral devices without having to disclose information related to the generation of the private keys. Alternatively, the peripheral device manufacturer could generate the private keys and store them on the peripherals, either in an ASIC, or some other storage on the peripheral.

After or as part of manufacturing the peripheral devices, the manufacturer provisions a private key for the peripheral devices. The provisioning may include any plan or process for distributing private keys to embed on the peripheral devices. Private keys may be provisioned for groups of peripheral devices. The groups may be based on device type, manufacturer, geography (e.g., country), or a combination of these. Thus, a single private key could be issued to (or embedded on) a group of peripheral devices. In one embodiment, different private keys can be issued at the same manufacturer for different peripheral device types, or different peripheral device specifications. For example, a manufacturer may use the same private key for all devices, or alternatively could use different private keys for external hard drives and USB sticks. In another example, USB sticks having one capacity may be issued a different private key than USB stick having a different capacity.

On the side of the verifier and the computing device, a single public key could be issued per device type (e.g., all USB sticks), per manufacturer (e.g., different companies), or per function-based technology (e.g., one public key for vPro, and another public key for another technology). Other combinations are possible.

The hardware platform of the computing device may include a variety of buses to which peripheral devices may be connected. In one embodiment, the hardware platform includes a "chipset", referring to a system of one or more circuit element and/or ICs that perform control and/or management functions for the platform. The chipset may include the verifier, including hardware logic to perform verification functions. The verification functions include execution of the authentication protocol used to authenticate the peripherals. The hardware platform includes a storage element (e.g., a flash storage) that stores the public key or public keys used to verify private keys. Each public key authenticates multiple different corresponding private keys.

In one embodiment, the verifier is included in a manageability engine (ME) on the computing device. The ME includes processing resources separate from the primary or host processing resources of the computing system. Thus, the ME operates independently of the host operating system, and may not be accessible via the host operating system. Not all computing devices necessarily include an ME. Examples of computing devices may include server, desktop computers, laptop computers, netbooks, tablet computers, and even smartphones or other handheld devices.

The verifier receives a signed message from a peripheral device over a bus to which the peripheral device is connected. The verifier authenticates the signed message with the public key, and identifies device and functionality characteristics of the peripheral device responsive to the authenticating the signed message. If the peripheral device properly authenticates, the verifier can authorize the peripheral device for the identified functionality.

The verifier may detect a connection of the peripheral device to the computing device. The detecting may occur as part of detecting insertion of the peripheral into the computing device, or as part of enumeration of peripheral connections. The detection may occur via interrupt or through polling. The system can be designed so that either the peripheral or the verifier initiates the authentication protocol exchange. In one embodiment, the verifier sends an authentication request, to which the peripheral responds with a signed message, signed with the private key. The verifier then determines with the public key whether the message was validly signed. If authentication is successful, full functionality in the connection may be provided to the peripheral device (e.g., higher-speed data exchange, enhanced security features, or even allowing a secure boot from the device, or other features) instead of standard functionality when authentication fails.

Many peripheral buses on a computing device include a control path in addition to a data path. In one embodiment, the authentication of the peripheral device is performed through the bus control path. Alternatively, the authentication exchange can occur over a data path for the peripheral device.

FIG. 1 is a block diagram of an embodiment of a system having a verifier to authenticate peripheral devices. System 100 includes computing device 110, which represents any type of computing device or computer that can include a peripheral device authentication verifier. Computing device 110 includes verifier 112, which executes a protocol exchange with peripherals that are connected to the computing device. In one embodiment, peripheral devices are identified by bus 122, device 124, and functionality 126 (BDF).

Bus 122 represents a bus (e.g., USB, SATA) to which the peripheral is connected. Bus 122 includes hardware ports and transmission elements, as well as drivers and control hardware. Bus 122 also includes logic to manage the bus connections. Device 124 can identify the device by type, manufacturer, or other classification. The device identification can be through string or other identifier. Functionality 126 indicates the type of functionality that will be enabled for a particular device 124 on a particular connection (bus 122). Different devices on the same bus may have different functionality. Functionality 126 is affected by whether verifier 112 is able to authenticate a private key identifier of the connected peripheral device.

Verifier 112 can be implemented in a number of different ways within computing device 110. For example, verifier 112 could be implemented in logic within a manageability engine (ME) of the computing device. Alternatively, verifier 112 could be implemented in logic integrated on the same die as a primary processor of computing device 110 (such logic may be referred to as "uncore" seeing that it is on the "core" die or the die with the processing cores, but it is not the core processing logic). Alternatively, verifier 112 could be implemented in logic in microcode on a read only memory (ROM) or flash embedded on the computing device.

System 100 illustrates two peripheral "types" 130 and 140. Peripheral 130 represents peripheral devices that include a valid private key corresponding to a public key used by verifier 112 to authenticate the peripheral. Peripheral 140 represents peripheral devices that either do not include a private key, or that include a private key that is invalid, such as a revoked private key. It will be understood that not all peripherals 130 are made by the same manufacturer. Likewise, not all peripherals 140 are made by the same manufacturer. The companies responsible for computing device 110, verifier 112, peripheral 130, and issuer 150 are not necessarily the same company, although they might be.

Issuer 150 represents an entity (e.g., company) that issues one of multiple private keys to peripheral 130, and a corresponding public key to verifier 112. In one embodiment, issuer 150 indicates restrictions on how private keys are to be provisioned to peripherals. Alternatively, the peripheral manufacturer could be responsible for provisioning keys among various products, including grouping products for the distribution of keys. Thus, there is not necessarily an issuer 150 in all embodiments.

While certain details have been described with specific reference to FIG. 1, it will be understood that the details may provide non-limiting examples. In general, the use of a public key with multiple associated private keys allows for authentication of peripheral devices and the enabling of functionality for the peripheral. In one embodiment, the keys comply with SafeID available from Intel Corporation. SafeID technology provides an advantage over traditional asymmetric or symmetric cryptography in preventing peripheral devices from being used as tracking devices.

With the use of peripheral authentication described herein, a peripheral device cannot present itself to a computing device as something it is not, because its identity can be reliably verified. Thus, technology within a computing device designed to provide additional functionality, improved performance, and/or better power efficiency can be utilized with known qualifying peripheral devices, while preventing other devices from attempting to use such technology when its compliance to standards of the technology are not known or verified. In one embodiment, the authentication protocol is used in conjunction with a peripheral device discovery protocol that allows network connected services to discover attached peripheral devices and securely provision or configure the peripheral. In one embodiment, only devices that implement behavior compliant with a technology of a computing device are provisioned private keys that allow authentication with the system on a computing device to utilize the technology (e.g., vPro).

The use of a single public key that can uniquely authenticate multiple private keys has been assumed to this point. Regarding number theory for the public-private key usage discussed herein, consider the following.

Let $G=<g>$ be a cyclic group of prime order q–G could be either a Schnorr group of an elliptic curve group, where G can be used for revocation purposes;

Under a discrete logarithm (DL) assumption: given two random elements a, b in G, it is computationally hard to compute x such that $ax=b$; and Under the decisional Diffie-Hellman (DDH) assumption: it is computationally hard to distinguish two distributions ($g^{\hat{}}$, $g^{\hat{}}b$, $g^{\hat{}}ab$) and ($g^{\hat{}}a$, $g^{\hat{}}b$, $g^{\hat{}}c$), where a, b, c are randomly chosen from Zq.

Let f1 and f2 be two integers in [0, q−1];
Let B be a non-identity element in G;
then $f1=f2 \leftrightarrow B^{\hat{}}f1=B^{\hat{}}f2$; and $$f1 \neq f2 \leftrightarrow B^{\hat{}}f1 \neq B^{\hat{}}f2.$$

Assume that each peripheral has a unique member exponent f, where f is part of a DAA (direct anonymous attestation) private key.

The peripheral device intentionally reveals (B, K); where B is an element in G; $K=B^{\hat{}}f$; and f is the peripheral's private exponent.

The peripheral needs to use zero-knowledge proof to prove that K was constructed.

The (B, K) pair is part of a group signature, and is used for the purpose of revocation, where B is called Base, K is called Pseudonym—revealing (B, K) does not violate anonymity or unlinkability properties.

The following then hold true: Given (B, K), the verifier cannot compute f under the DL assumption (thus proving anonymity); and, Given (B1, K1) and (B2, K2) from two signatures where $K1=B1^{\hat{}}f1$ and $K2=B2^{\hat{}}f2$, if $B1 \neq B2$ and B1 and B2 are chosen randomly, the verifier cannot tell whether $f1=f2$ under the DDH assumption (thus proving unlinkability).

Figure 2:
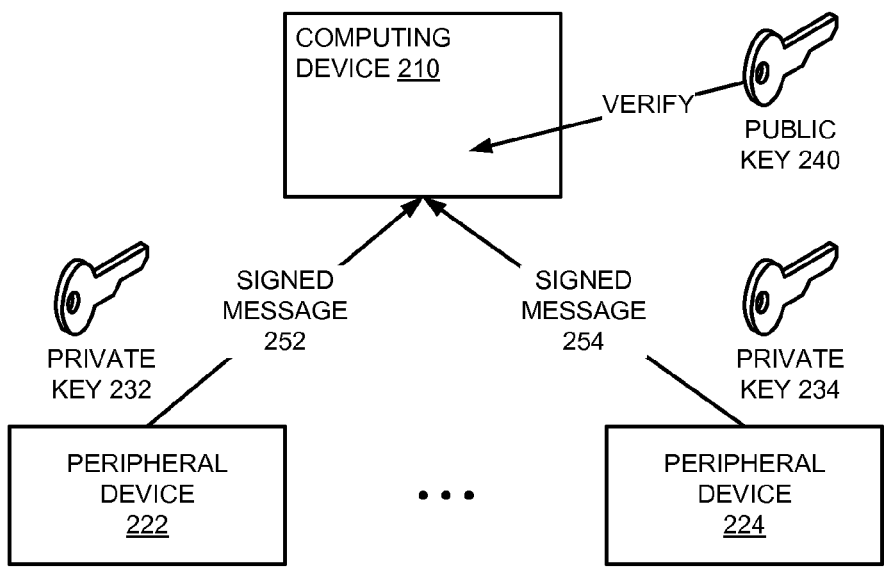
FIG. 2 is a block diagram of an embodiment of a system with a public key that validates multiple private keys.

FIG. 2 is a block diagram of an embodiment of a system with a public key that validates multiple private keys. System 200 represents elements of a system similar to system 100 of FIG. 1. Computing device 210 is a computing device according to any embodiment that can store public key 240, and use public key 240 to verify multiple corresponding private keys.

Based on authorization of the private keys, computing device 210 selectively authorizes functionality for a connected peripheral device.

As illustrated in system 200, multiple private keys can be verified by public key 240. The assumption in system 200 is that each private key 232-234 is presented to be authenticated by public key 240. In one embodiment, computing device 210 includes additional public keys (not shown). Each peripheral device 222-224 is assigned a private key unique to the device or a group of devices to which it belongs. Peripheral devices 222-224 send signed messages 252-254, respectively, to computing device 210 for verification.

In one embodiment, private keys are generated based on a "name base" used for compliant peripherals to assert membership as compliant to a verifier in computing device 210 or another computing device (not shown) to which they may be connected. In such an implementation, the correct name base must be used by the member or the verifier cannot complete the verification. Based on zero-knowledge proof, the verifier determines if a string exits by testing the secure portions of a signed message, and it can then conclude the string exists because of the existence of a secure signature.

For example, an authorized (member) peripheral that implements features S=[S1, . . . , Sn] can derive a base B that is specific to the feature set by hashing the feature set name (N1=feature-to-name(S1)) with the name base. E.g. B=Hash (Name.Base||N1||N2|| . . . ||Nn), where B is used to verify the member peripheral is authorized to use the feature set S. As a more specific example, consider a vPro platform where an SSD peripheral might expose an HDD cache, an audit log facility for an ME auditing subsystem, and additional storage for ME metadata. By including a name for each supported feature in B, an ME could verify the SSD is authorized to implement these features.

On the verifier side within computing device 210 (verifier not explicitly shown) the verifier sends the name base and constituent named services to the peripheral, and both parties derive B. If either party tries to cheat the protocol, then the subsequent protocol exchanges detect and expose the cheating. In one embodiment, the authorization of peripherals as described herein may be performed with reference to IEEE 1667 ("Standard Protocol for Authentication in Host Attachments of Transient Storage Devices"), 2006. IEEE 1667 describes the use of silos, which are functional units that respond to 1667 commands, and which can provide authentication services between the computing device and the peripheral. Integration of IEEE 1667 silos can be achieved by including a Silo-ID in the calculation of B. For example, let B=Hash(Name.Base||Silo-ID1||Silo-ID2|| . . . ||Silo-IDn). The B can be used in advance of an IEEE 1667 probe protocol to verify the device supports additional value-added silos.

Figure 3:
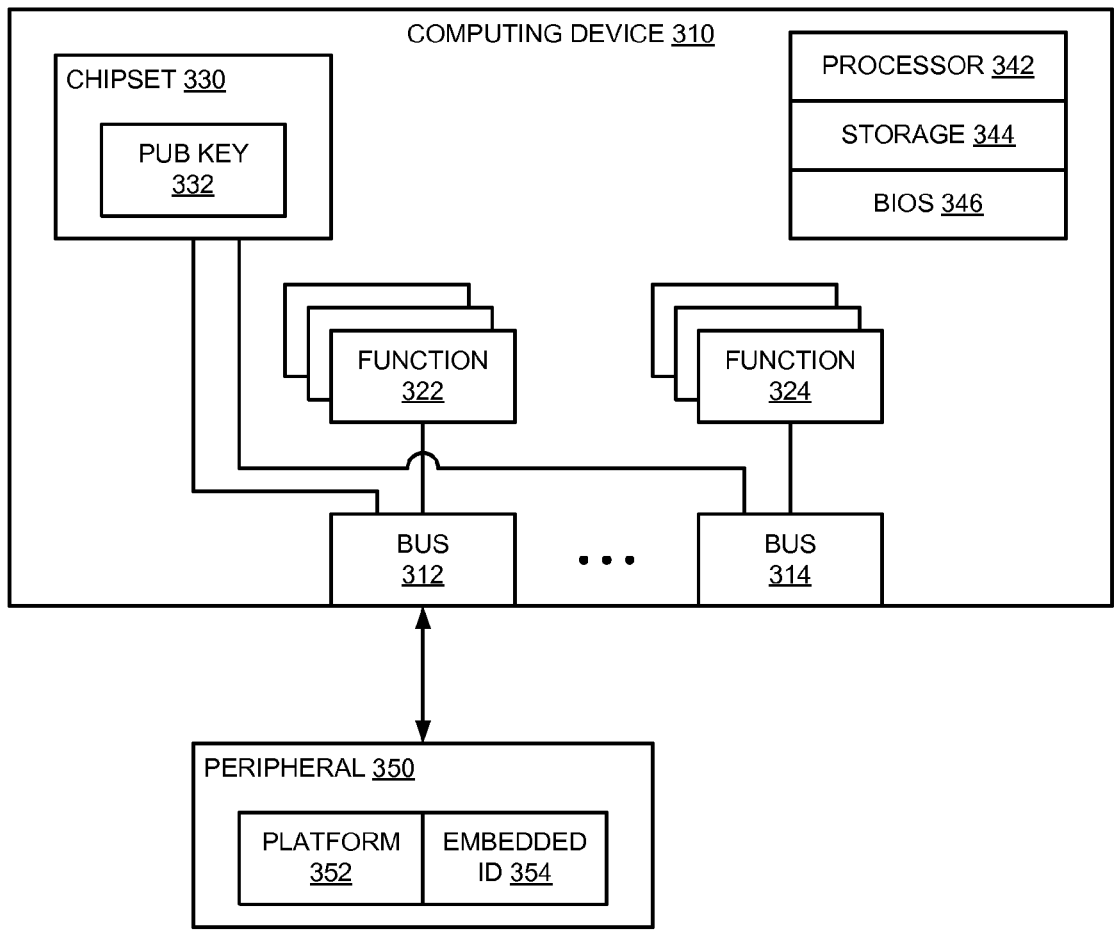
FIG. 3 is a block diagram of an embodiment of a system with a public key stored in a chipset to authenticate a private key stored in a peripheral device.

FIG. 3 is a block diagram of an embodiment of a system with a public key stored in a chipset to authenticate a private key stored in a peripheral device. System 300 includes computing device 310, which represents a computing device having a public key (pub key 332) that authenticates multiple private keys. Thus, computing device 310 includes hardware and/or software to authenticate a peripheral device, and provide functionality to the device based on authentication.

System 300 illustrates the concept of access control by the port into which peripheral 350 is connected. Each peripheral port or hardware connector on computing device 310 may include a bus to connect a peripheral to hardware on the computing device. The access control can be managed by use of a BDF interface, where bus number, device number, and function are put together as an interface type, or as an identifiable interface configuration.

Thus, peripheral 350 is connected to bus 312 of computing device 310. Computing device 310 includes multiple buses 312-314. Each bus has associated functionality represented by function sets 322-324, respectively. Peripheral 350 includes hardware platform 352, which provides the peripheral functions of the device, and embedded ID 354. Embedded ID 354 includes a private key that is authenticated by public key 332.

In one embodiment, authentication of peripheral devices for computing device 310 is controlled by chipset 330, which represents at least a portion of control hardware of a hardware platform of computing device 310. Chipset 330 may be an actual chipset or socket unit into which a processor (processor 342) is inserted, and which includes controls for peripherals, ports, and buses in computing device 310. Computing device 310 includes processor 342, which may include any type of processing resources or host processor of computing device 310 to execute an operating system and execute programs and operate user interfaces. As shown, chipset 330 may include public key 332 and logic to implement the peripheral authentication. In one embodiment, the logic to implement the peripheral authentication and public key 332 are included in circuitry on a die of processor 342, which includes the host processor and the additional logic on the same die.

Processor 342 also includes memory resources (not shown) to store temporary values, code, and variables for system execution. Storage 344 represents one or more storage devices on computing device 310, and may include hard drive resources (which would connect through a peripheral bus, such as SATA), and/or storage devices on the hardware platform (such as embedded flash devices). BIOS (basic input/output system) 346 represents a startup or boot system of computing device 310, which initializes the hardware platform and initiates operation in the computing device. BIOS 346 initializes buses 312-314 to prepare the buses and their associated hardware ports for operation.

Peripheral 350 presents embedded ID 354 to computing device 310, and more specifically to chipset 330 for verification. It will be understood that peripheral is removably connectable to bus 312, because it can be plugged in and unplugged to the port. Peripheral 350 may be considered traditionally "portable" such as flash drives, phones, cameras, or other devices, but could also be a hard drive or other component. Chipset 330 includes public key 332 and a verifier (not explicitly shown in system 300), which is connected to each bus 312-314, and can authenticate peripherals connected to any and all of the buses. In one embodiment, different public keys are used for different buses, different peripheral types, and/or different peripheral manufacturers. Based on verification of an attached peripheral, chipset 330 enables selected functions from an associated function set (function 322 of bus 312 for peripheral 350).

Figure 4:
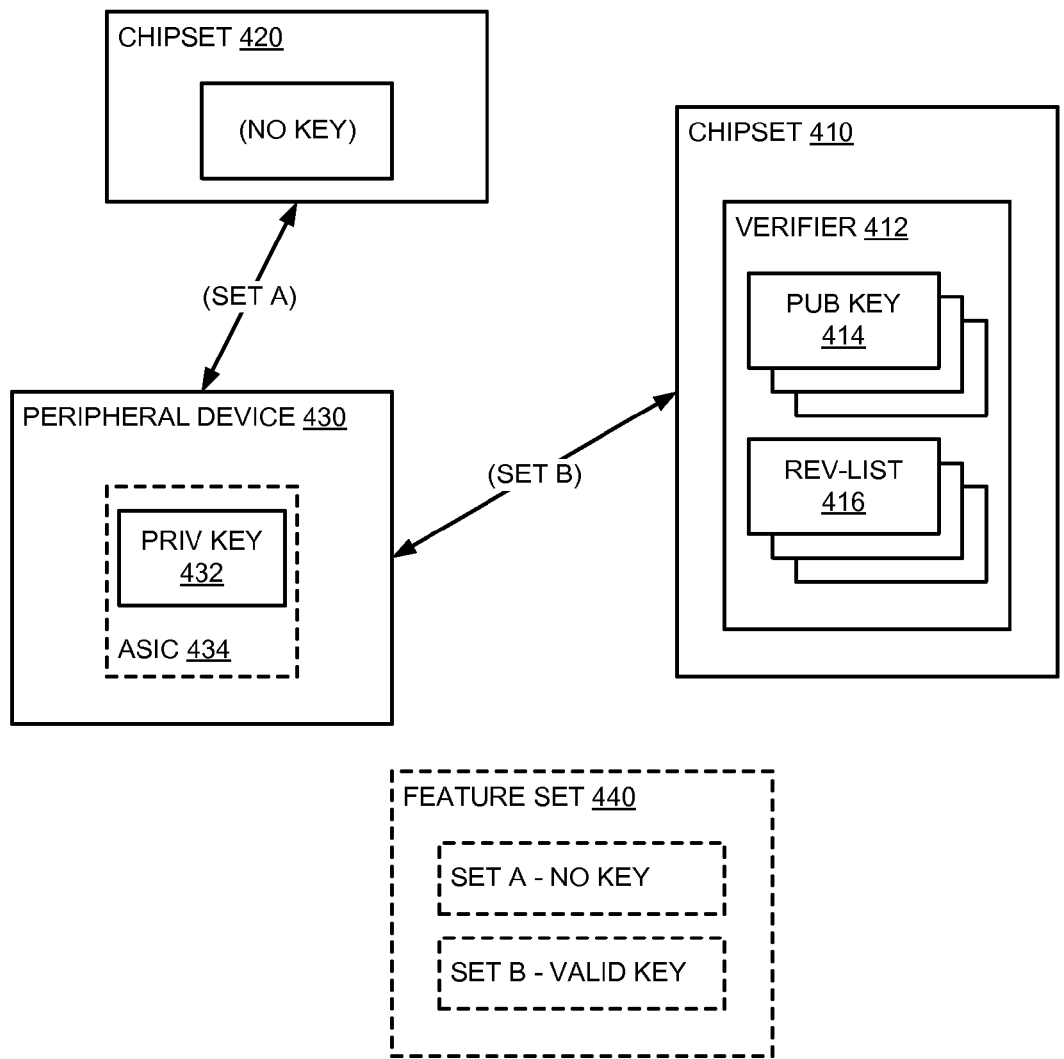
FIG. 4 is a block diagram of an embodiment of a system having different functionality sets based on whether a peripheral device is authenticated.

FIG. 4 is a block diagram of an embodiment of a system having different functionality sets based on whether a peripheral device is authenticated. As discussed above, different functionality sets may be enabled for different peripheral devices based on whether the peripheral devices include a valid private key. In one embodiment, as discussed in more detail below, not all private keys that correspond to a public key are valid or authorized. Additionally, peripheral devices may operate with different feature sets on different computing devices if the computing device does not offer the additional functionality.

As illustrated, peripheral device 430 includes private key 432. In one embodiment, private key 432 is embedded on an application specific integrated circuit (ASIC) 434, which is in turn embedded on peripheral device 430. ASIC 434 can be inserted anywhere on the hardware platform of peripheral device 430. In one embodiment, ASIC 434 includes all logic necessary to implement the peripheral authorization protocol exchanges with a computing device. Private key 432 could alternatively be embedded on peripheral device 430 in a ROM or a flash device that stores the key value (and potentially logic to implement the authorization protocol exchanges).

Also illustrated is feature set 440, which indicates which feature sets are available based on authorization of peripheral device 430. It will be understood that feature set 440 represents what functionality will be authorized for peripheral device 430 when properly validated with a participant computing device, or a computing device that includes a corresponding public key and implements the protocol. Feature set A is provided for peripheral devices when a valid key cannot be authenticated for the peripheral. When the peripheral device is properly authenticated, feature set B is enabled for the peripheral.

It will be understood that enabling the features of feature set B as illustrated in FIG. 4 can occur only when a verifier properly authenticates peripheral device 430. If a computing device to which peripheral device 430 is connected does not implement the protocol, the computing device cannot enable the features of feature set B. Thus, as shown, when peripheral device 430 is connected to chipset 420, which does not contain a public key and does not implement the peripheral authentication, feature set A is enabled for peripheral device 430. However, assuming private key 432 is a valid key that verifier 412 of chipset 410 can authenticate, feature set B is enabled for peripheral device 430 with chipset 410.

Chipset 410 and chipset 420 represent the computing devices into which they would be built. Chipset 410 includes verifier 412, which includes one or more public keys 414, and one or more associated revocation lists 416. Revocation list 416 indicates what if any private keys are not authorized. Thus, assume that private key 432 is an actual private key that can be authenticated by public key 414, if private key 432 is indicated on revocation list 416 as being revoked, verifier 412 would only enable feature set A for peripheral device 430, rather than feature set B. In one embodiment, there is a corresponding revocation list 416 for every public key 414. Alternatively, a single revocation list 416 could be implemented for multiple public keys 414.

Regarding revocation list 416, it will be understood that it may be possible for an attacker to crack a peripheral device to obtain its private key value. Thus, it may be possible to produce "fake" or imposter peripherals using the stolen device identity. A fake or imposter peripheral is a peripheral that includes a private key capable of being authenticated by a corresponding public key. However, a fake peripheral is not a "member" device that is guaranteed authentic for compliance with standards related to extended or enhanced feature sets for peripheral device connections.

In one embodiment, verifiers on computing device platforms collect audit trail information. While privacy can be maintained for valid peripherals, data can be stored and reported for unauthorized peripherals presenting private keys. In the scenario of a fake peripheral, a rogue manufacturer would eventually be discovered because of the collected audit trail information, which can be analyzed to detect duplicate peripheral device IDs. Once a private key is known to be compromised, verifiers can efficiently check a revocation list (such as revocation list 416) for revoked keys. Thus, the integrity of the feature set for authorized devices can be protected.

Verifier 410 checks the keys to authenticate the peripheral device with the key. The public key of verifier 410 is widely distributed, and authenticates multiple private keys. With the use of revocation list 416 to identify revoked private keys, the verifier can keep the same public key even when a private key is revoked. Revocation list 416 is updated to indicate newly revoked keys. The updates can occur periodically, at boot time of the computing device, or can be pushed or identified through known update mechanisms. Thus, updates to the revocation list can identify any known invalid device IDs. In one embodiment, the rogue or invalidated device ID is not disclosed. Revocation list 416 can be stored in a way that the specific device ID is not disclosed. For example, the IDs on revocation list 416 can be stored in encrypted form or as a hash value.

Thus, as will be understood, revocation list 416 can be updated without any change to public key 414, or design changes to either the verifier or peripheral devices. The only devices that may need to be changed are the ones having compromised keys—all other private keys would still be valid. Thus, public key 414 can still be widely distributed without risk of system disruption by a stolen private key.

Figure 5:
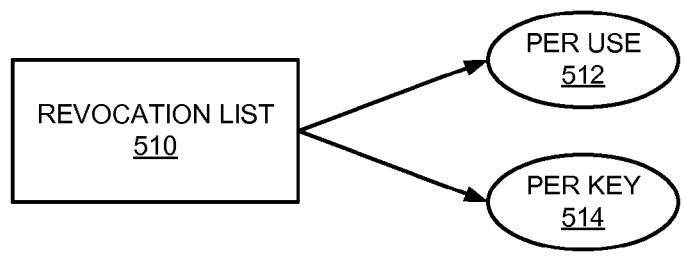
FIG. 5 is a block diagram of an embodiment of revocation of private keys based on per use or per key applications.

FIG. 5 is a block diagram of an embodiment of revocation of private keys based on per use or per key applications. Revocation can be asserted at different levels of granularity—against the key (per peripheral) or against a signature generated by the key (per use). Per use revocation allows specific features implemented by the peripheral to be disallowed while others remain usable. Per device revocation indicates that a key from one company gets revoked, but the devices from another company may remain valid. If the company has multiple keys, the other keys would still be valid. Per use revocation indicates that even the compromised key is still good, but a function normally available to the peripheral based on the valid key is no longer authorized. Thus, for example, where functions A-D may remain allowed, which functions E-Z are disallowed or unauthorized for the key. Functions E-Z could still be valid for other keys.

Thus, signature or private key revocation may be necessary if a legitimate peripheral attempts to access services or functionality it is not authorized to use. Regarding revocation verification with key revocation, the concept can be described for a per device or per key (514) revocation as follows: 1) A member peripheral obtains a unique member private key including a unique member exponent f1; 2) A verifier learns of a compromise off and builds a revocation list of private keys PRIV-RL (510)=(f1, f2, . . . , Fn). In one embodiment, the verifier compares the revocation list each time it is introduced to a peripheral; and, 3) When the peripheral attempts to prove membership using f1, it is disallowed access to functionality because f1 is on the list PRIV-RL.

Regarding revocation verification with signature revocation, the concept can be described for per use (512) revocation as follows: 1) Verifier logic builds a list of suspect transactions based on signatures from a suspect peripheral, SIG-RL (510)={(B1, K1) . . . , (Bn, Kn)}. The verifier sends SIG-RL, B, and a message M. M contains protocol information not in B; 2) The member peripheral checks to see if the revoked transactions are on the revocation list SIG-RL. If yes, then the peripheral stops executing the protocol; 3) The member peripheral constructs a transaction including signed (B, K) pairs. For every exchange of (B, K) where $K=B^f$, the peripheral asserts that $Bi^f \neq K$ for every pair of (B, K) in SIG-RL; and, 4) The verifier checks the proofs by cross referencing (B, K) pairs in SIG-RL. If they appear in the list, the verifier concludes that the member peripheral does not have rights to the requested service. The verifier can also perform a key revocation check as described above.

Figure 6:
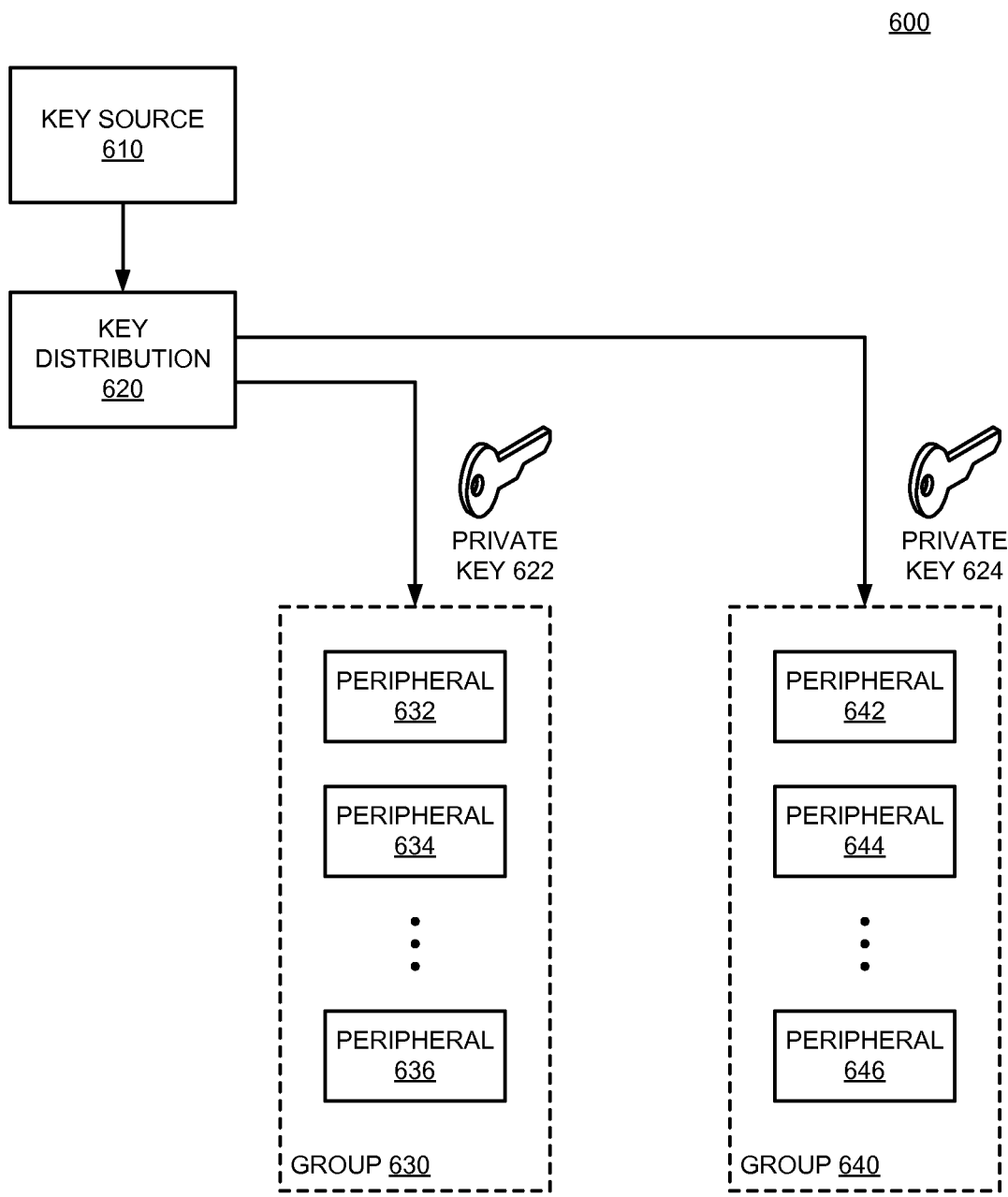
FIG. 6 is a block diagram of an embodiment of a system for embedding private keys in peripheral devices.

FIG. 6 is a block diagram of an embodiment of a system for embedding private keys in peripheral devices. System 600 illustrates the embedding of private keys on peripheral devices. In one embodiment, system 600 represents a single manufacturer of peripheral devices. Key source 610 is a key issuer, which provides either keys (as values or numbers) to the manufacturer, provides a formula or calculation that can generate valid private keys, provides ASICs with valid private keys already loaded, or some combination. Key distribution 620 represents mechanisms to determine how to provision keys, and the mechanisms for provisioning or assigning keys to devices. In one embodiment, key distribution 620 includes elements at the key source, which determine how to distribute keys to manufacturers. In one embodiment, key distribution 620 includes elements at the manufacturer, which determine how to allocate keys among the products, or which implement a key assignment provided by key source 610. Key distribution 620 may include elements both at the key source and the manufacturer.

In one embodiment, groups of peripherals are established in system 600. Group 630 includes peripherals 632-636, while group 640 includes peripherals 642-646. It will be understood that there is no requirement for each group to contain the same number of peripherals. In one embodiment, a private key value 622 is allocated to the peripherals in group 630, while private key value 624 is allocated to the peripherals of group 640. As discussed herein, keys can be distributed in any of a number of ways, and system 600 illustrates one embodiment where peripheral devices are grouped and assigned a private key value for the group. Each device may still include a unique identifier such as an ID or an exponent, which can be applied across groups of devices, or individually for each device.

Reference is made above to member peripherals, meaning peripherals that comply with various standards related to peripheral authentication as described herein. In one embodiment, member peripherals are manufactured by the key issuer or key source 610. In addition, other manufacturers may comply with the key issuer's requirements to manufacture member peripherals. For purposes of simplicity in this discussion, such manufacturers are referred to as member vendors. Member vendors allocate a block of IDs (identifiers) that are inserted into peripherals at manufacture to provide private keys for the peripherals. In one embodiment, key source 610 generates a Group public key and defines the criteria for group membership. Each member peripheral receives a unique private key that can be verified using the Group public key.

The Group public key is embedded or provisioned with every participating device that may encounter a member peripheral. A member peripheral uses the member private key to digitally sign a message that is delivered to a verifier on the participating device. The signed message is verified using the Group public key. In one embodiment, each group member generates a distinct signature that can be verified using a single Group public key. The fan-out property allows many peripherals to be manufactured with unique identities, but does not require an equal number of public keys to be managed and stored by verifier platforms.

Multiple groups can be maintained for peripheral devices. The groups can be maintained by the issuer and/or the manufacturer (assuming the manufacturer maintains groups in accordance with the issuer's permissions). For example, one Group public key (G1) could be used for issuer manufactured peripherals, and a different Group public key (G2) for non-issuer manufactured peripherals. As long as devices manufactured by the issuer contain the public key for each participating group, peripherals manufactured by member vendors assigned to the group can be used with the issuer devices. In one embodiment, public keys can be different at different locations, for example, which would provide different functionality depending on the location.

There is no theoretical limit to the number of Group public keys that can be assigned to member vendors and their associated products. As a practical matter, the only limitations may be the management of keys. Thus, for example, a peripheral from a member vendor can be issued a block of private keys to be inserted into the peripheral devices using a registration protocol. For all the reasons above, the private keys as described herein provide improved privacy and security properties over known systems. There are multiple unique private keys that can be verified by a common public key, but the private keys cannot be used to uniquely identify or track the peripheral device. In the case that a peripheral device is assigned to a group containing the single peripheral, there is an exception to the inability to uniquely identify or track the peripheral device through the private key. However, assigning multiple peripheral devices to a group ensures improved privacy over known systems.

When the member peripherals are inserted in a compliant platform (a member platform, or one that complies with the peripheral authentication described herein), the member platform makes available a feature set (e.g., FeatureSet-A) for compliant peripherals. However, if member peripheral is inserted into a non-member platform, it exhibits a different feature set (e.g., FeatureSet-B). Similarly, member platforms may exhibit FeatureSet-A when a connected peripheral is known to be in a compliant mode, and a different set of features (e.g., FeatureSet-B) if not in the compliant mode.

Figure 7:
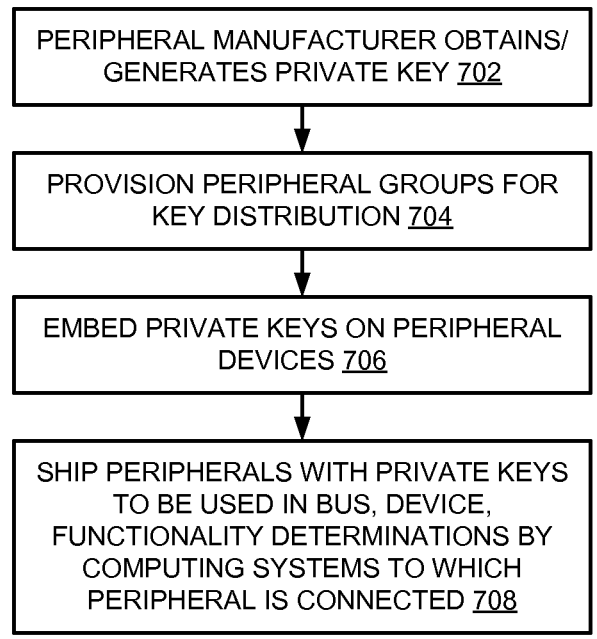
FIG. 7 is a flow diagram of an embodiment of a process for embedding private keys on peripheral devices.

FIG. 7 is a flow diagram of an embodiment of a process for embedding private keys on peripheral devices. Flow diagrams as illustrated herein provide examples of sequences of various process actions, which may be performed by processing logic that may include hardware, software, or a combination. Although shown in a particular sequence or order, unless otherwise specified, the order of the actions can be modified. Thus, the illustrated implementations should be understood only as an example, and the process can be performed in a different order, and some actions may be performed in parallel. Additionally, one or more operations can be omitted in various embodiments of the invention; thus, not all actions are required in every implementation. Other process flows are possible.

A peripheral manufacturer obtains a private key, 702. Obtaining the private key may be receiving a key value, an ASIC or other IC with the private key or a private key value loaded on it, or the manufacturer may generate the private key in accordance with instructions from a key issuer. The private key is for a peripheral device manufactured by the peripheral manufacturer. The private key may be obtained for an already-produced peripheral device, or may be obtained for a peripheral device to be manufactured.

In one embodiment, the key issuer and/or the peripheral manufacturer provision groups for key distribution, 704. As discussed herein, peripherals can be grouped within a manufacturer, or devices from different manufacturers may be part of the same group. When member peripherals are ready to receive a private key, the private keys are embedded on the peripheral devices, 706. The keys may be embedded on finished peripherals (e.g., as part of device configuration, quality control, and/or testing) or embedded on parts that are then incorporated into a peripheral device.

In one embodiment, provisioning the private key for the peripheral includes provisioning unique private keys to each member of a group of peripheral devices, where each private key proves membership in the group. Thus, multiple peripheral devices have unique keys, but all prove membership into a group indicating all of the peripherals collectively. In one embodiment, provisioning a single private key for a group of peripherals includes provisioning different private keys for different peripheral device types. Thus, the groups indicate a particular device type, which is in turn associated with private keys that each prove membership in the group for the device type. In one embodiment, provisioning a single private key for a group of peripherals includes provisioning private keys for a peripheral device type for different manufacturers of the peripheral device type, where each private key for the peripheral device type for the different manufacturers proves membership in a group indicating the device type.

The peripherals when finished, and loaded with a valid private key, are shipped. The private keys are to be used in bus, device, functionality (BDF) determinations by computing systems to which the peripheral is connected, 708. The determinations are used by the computing devices to enable functionality by which the peripheral device connects and interoperates with the computing device.

Figure 8:
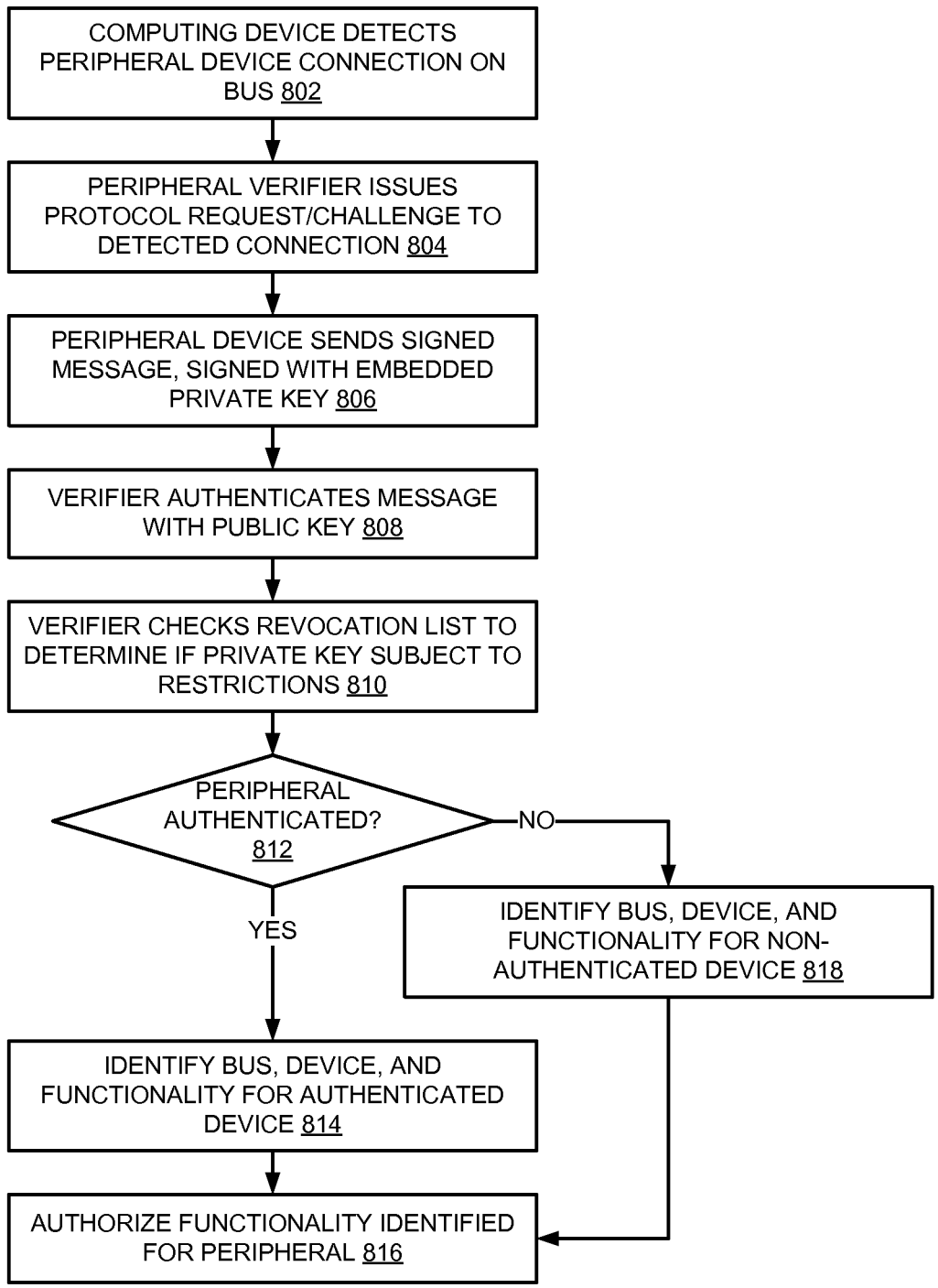
FIG. 8 is a flow diagram of an embodiment of a process for authenticating a peripheral device with a computing device.

FIG. 8 is a flow diagram of an embodiment of a process for authenticating a peripheral device with a computing device. A computing device that performs peripheral authentication detects a peripheral device connection on a bus of the computing device, 802. The computing device has a public key that authenticates multiple corresponding private keys to verify the identity and functionality authorization of a peripheral device. The detection can occur responsive to polling the bus for connection, or responsive to a connected peripheral sending an indication that it is connected. The detection may occur in conjunction with plugging the peripheral into the bus, or with a device enumeration of all connections on the bus by the computing device.

The computing device includes a peripheral verifier that uses the public key to authenticate the connected peripherals to determine what functionality should be enabled on the connection bus for the peripheral. In one embodiment, authentication includes the verifier issuing a protocol request or a protocol challenge to the detected peripheral, 804. The peripheral device sends a signed message to the verifier, signed with its embedded private key, 806. The verifier authenticates the message with its stored public key, 808.

The verifier performs a check to determine if the key is a valid private key. The verifier also checks a revocation list to determine if the private key is subject to a restriction, 810. If the peripheral is authenticated, the verifier identifies a bus, device, and functionality interface for the authenticated peripheral device, 814. The authenticated device is enabled to use certain features for compliant member peripherals in its connection with the computing device. The verifier authorizes the functionality identified for the peripheral, 816, which in this case is full functionality.

If the peripheral device cannot be authenticated, 812, the verifier identifies a bus, device, and functionality interface for a non-authenticated peripheral device, 818. The non-authenticated peripheral is enabled to use a restricted feature set, or a basic feature set, or a set of functionality different (and less) than what is permitted for authenticated devices. The verifier authorizes the functionality identified for the peripheral, 816, which in this case is restricted functionality.

To the extent various operations or functions are described herein, they may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A peripheral device comprising:
   a hardware port to removably connect the peripheral device to a bus of a computing device, the peripheral device to provide a peripheral function to the computing device when connected to the computing device;
   a storage device to store a private key associated with the apparatus, the private key being one of multiple private keys that are associated with a corresponding public key, the public key to authenticate the multiple private keys, each one of the multiple private keys associated with a different peripheral device, the private key corresponding to a set of specific functions that the peripheral device is designed to provide; and
   the hardware port to send a message encrypted with the private key to the computing device, the computing device to identify functionality characteristics of the peripheral device by applying the public key to the message and successfully authenticating the peripheral device, the hardware port to receive authorization from the computing device to provide the functionality characteristics for the peripheral device in response to the computing device's successful authenticating of the peripheral device.

2. The peripheral device of claim 1, wherein the hardware port connects to one of a universal serial bus (USB), a serial advanced technology attachment (SATA) bus, or a Firewire bus.

3. The peripheral device of claim 1, wherein the storage device further comprises:

an application specific integrated circuit (ASIC) embedded on the peripheral device.

4. The peripheral device of claim 1, further comprising:
hardware logic to present the message encrypted with the private key as part of a protocol exchange with a computing device to which the peripheral device is connected.

5. The peripheral device of claim 1, wherein the peripheral device is to present the message encrypted with the private key in response to receiving a protocol authentication request from the computing device.

6. The peripheral device of claim 1, wherein the peripheral device is to present the message encrypted with the private key over a control path of the bus to which the peripheral device is connected.

7. A method performed by a peripheral device, comprising:
connecting to a bus of a computing device, the peripheral device to provide a peripheral function for the computing device when connected to the computing device;
sending a message encrypted with a private key from the peripheral device to the computing device via the bus, the private key being one of multiple private keys that are associated with a corresponding public key, the public key to authenticate the multiple private keys, each one of the multiple private keys associated with a different peripheral device, the private key corresponding to a set of specific functions that the peripheral device is designed to provide; and
receiving authorization to provide the peripheral function to the computing device based on the computing device having identified the peripheral function by applying the public key to the encrypted message and successfully authenticating the peripheral device.

8. The method of claim 7, wherein connecting comprises connecting to one of a universal serial bus (USB), a serial advanced technology attachment (SATA) bus, or a Firewire bus.

9. The method of claim 7, further comprising storing the private key by an application specific integrated circuit (ASIC) embedded on the peripheral device.

10. The method of claim 7, wherein sending the message encrypted with the private key further comprises presenting the message as part of a protocol exchange with the computing device.

11. The method of claim 7, wherein sending the message encrypted with the private key comprises sending the message in response to receiving a protocol authentication request from the computing device.

12. The method of claim 7, wherein sending the message encrypted with the private key comprises sending the message over a control path of the bus to which the apparatus is connected.

13. A method comprising:
provisioning one of multiple private keys for a peripheral device, the one private key corresponding to a set of specific functions that the peripheral device is designed to provide, the multiple private keys associated with a corresponding public key, the public key to authenticate the multiple private keys, each one of the multiple private keys associated with a different peripheral device; and
embedding the provisioned private key on the peripheral device;
encrypting a message on the peripheral device with the private key;
presenting the encrypted message in a protocol exchange with a computing device to which the peripheral device is connected;
identifying the set of specific functions at the computing device by applying the public key to the encrypted message at the computing device to authenticate the peripheral device and authorizing the peripheral device to provide the set of functions in response to the authentication being successful.

14. The method of claim 13, wherein provisioning the private key for the peripheral device further comprises:
provisioning unique private keys to each member of a group of peripheral device.

15. The method of claim 13, wherein provisioning the single private key for the group further comprises:
provisioning private keys for a peripheral device type for different manufacturers of the peripheral device type, where each private key for the peripheral device type for the different manufacturers proves membership in a group indicating the device type.

16. The method of claim 13, wherein provisioning the private key for the peripheral device further comprises:
generating the private key.

17. The method of claim 13, wherein embedding the provisioned private key comprises:
embedding an application specific integrated circuit (ASIC) on the peripheral device.

* * * * *